United States Patent [19]

Hays et al.

[11] Patent Number: 5,640,582

[45] Date of Patent: Jun. 17, 1997

[54] REGISTER STACKING IN A COMPUTER SYSTEM

[75] Inventors: Kirk I. Hays, Hillsboro; Wayne D. Smith, Portland, both of Oreg.

[73] Assignee: Intel Corporation, Santa Clara, Calif.

[21] Appl. No.: 291,744

[22] Filed: Aug. 17, 1994

Related U.S. Application Data

[63] Continuation of Ser. No. 886,966, May 21, 1992, abandoned.

[51] Int. Cl.$^6$ ............................................. G06F 9/00
[52] U.S. Cl. ........................... 395/800; 364/DIG. 1; 364/DIG. 2; 395/378; 395/569
[58] Field of Search .......................... 395/800, 375; 364/DIG. 1, DIG. 2

[56] References Cited

U.S. PATENT DOCUMENTS

| | | | |
|---|---|---|---|
| 4,459,657 | 7/1984 | Murao | 364/200 |
| 4,530,049 | 7/1985 | Zee | 364/200 |
| 4,833,640 | 5/1989 | Baba | 364/900 |
| 4,942,524 | 7/1990 | Nunomura | 364/200 |
| 4,969,091 | 11/1990 | Muller | 364/200 |
| 5,050,067 | 9/1991 | McLagan et al. | 364/200 |
| 5,070,451 | 12/1991 | Moore et al. | 395/375 |
| 5,093,783 | 3/1992 | Kitada | 395/400 |
| 5,155,853 | 10/1992 | Mitsuhira et al. | 395/725 |
| 5,214,786 | 5/1993 | Watanabe et al. | 395/800 |
| 5,226,142 | 7/1993 | Vegesna et al. | 395/425 |
| 5,293,594 | 3/1994 | Nojiri et al. | 395/400 |
| 5,319,757 | 6/1994 | Moore et al. | 395/375 |
| 5,517,664 | 5/1996 | Watanabe et al. | 395/800 |
| 5,560,035 | 9/1996 | Garg et al. | 395/800 |

*Primary Examiner*—Thomas G. Black
*Assistant Examiner*—Valerie Darbe
*Attorney, Agent, or Firm*—Blakely, Sokoloff, Taylor & Zafman

[57] ABSTRACT

A computer system provides an expanded register set by employing transparent register stacks for each general purpose register. Each general purpose register and its corresponding set of auxiliary registers form a register stack. No register identification bits are required in processor instructions to reference auxiliary registers. A register set select storage area is a programmable register provided for the storage of a value that identifies the currently active register level. The register set select storage area is loaded using two additional processor instructions provided as part of the present invention. A register set switch is used for selecting a data path to the register level specified by the register set select storage area. A PUSHREG instruction is used to push the register stack pointer down one level. A POPREG instruction is used to move the register stack pointer up one register level. In a alternative embodiment of the present invention, the POPREG and PUSHREG instructions include an argument that specifies the single register stack that is manipulated. In another embodiment of the present invention, register stack underflow or overflow conditions are trapped using an interrupt process. Task switching is implemented with the present invention using a plurality of register stacks each associated with a task frame. In another embodiment of the present invention, the semantics of interrupts to the processor are changed to include an automatic PUSHREG and POPREG instruction execution.

20 Claims, 5 Drawing Sheets

REGISTER STACKING IN A COMPUTER SYSTEM

This is a continuation of application Ser. No. 07/886,966 filed May 21, 1992, and now abandoned.

BACKGROUND OF THE INVENTION

1. Field of the Invention

The present invention relates to the field of computer system or processor architectures. Specifically, the present invention pertains to the use of general purpose registers in a processor architecture.

2. Prior Art

Most modern computers provide a register set for the manipulation of data by a central processing unit (CPU). For example, the 80386 microprocessor manufactured by Intel Corporation of Santa Clara, Calif. provides eight general purpose registers and various processing instructions for manipulating data in those registers. The use of these registers and the associated processing instructions provides a high speed means for manipulating data. The number of clock cycles required to access information stored in a general purpose register is much less than the number of cycles required to access information in a memory, such as a dynamic random access memory (DRAM).

Currently, many programs require more registers than are provided by current computer architectures. In many cases, the code generated by high level programming languages (i.e., C, FORTRAN, or ADA) requires the use of more registers than the architecture provides. If enough general purpose registers are not available, data must be spilled to main memory. Access to main memory, however, is significantly slower than moving data between general purpose registers. Requiring a CPU to write information to main memory and then later read values back from memory significantly slows the operation of the computer.

It is advantageous to have a greater number of general purpose registers for a particular computer architecture. However, software operating on the computer system must be significantly modified to take advantage of the additional registers. Additionally, by increasing the number of general purpose registers provided in a computer architecture, the task of managing register allocation becomes more difficult.

In conventional computers, the identification of registers is encoded into a field of bits within register manipulation instructions. These register encodings identify the register or registers that are manipulated by the instruction. Typically, however, a limited number of bits is provided for each instruction. Thus, a limited number of bits is provided for encoding register identities in instructions. In conventional computer systems, therefore, the number of registers provided by the computer system architecture is limited by the size of the instruction format.

Thus, an improved computer system architecture providing an expanded register set is needed.

SUMMARY OF THE INVENTION

The present invention provides an expanded register set by employing transparent register stacks for each general purpose register.

The improved computer system architecture of the present invention comprises a central processing unit (CPU) and a plurality of general purpose registers R0–R7 coupled via a set of data lines. In addition, each general purpose register R0–R7 has associated with it and coupled to it a stack of auxiliary registers. Each general purpose register and its corresponding set of auxiliary registers form a register stack. For example, a register stack is comprised of R0, and $R0^1$–$R0^n$. Similarly, other register stacks for each general purpose register are provided. From the perspective of the CPU and processor instructions executing therein, each register stack is identified only by the identity of the corresponding general purpose register ( i.e. R0–R7 ). Thus, no additional register identification bits are required in processor instructions.

A set of registers at the same level in each of the register stacks is termed a register level. For example, a register level is comprised of $R0^1$–$R7^1$. Another register level is comprised of registers R0–R7. In general, register levels comprise registers from $R0^m$–$R7^m$ where m=0, n.

In support of the additional auxiliary registers, a register set select storage area is provided in the CPU. The register set select storage area is a programmable register used for the storage of a value that identifies the currently active register level. The register set select storage area is loaded using two additional processor instructions provided as part of the present invention. The register set select storage area is connected to a register set switch. The register set switch is used for selecting a data path to the register level specified by the register set select storage area. The register set select storage area is loaded with a value denoted the register stack pointer. For example, if the register set select storage area is loaded with a value of 2, the third register level is selected and the register set switch enables access to any of the registers in the third register level. Specifically, this register level includes registers $R0^2, R1^2, \ldots R7^2$. Subsequent to the programming of the register set select storage area and the corresponding action by the register set switch, any register instructions executed by the CPU will operate upon the registers in the register level specified by the register set select storage area.

As part of the present invention, two register stack manipulation instructions are provided as extensions to the existing instruction set. These instructions, denoted herein as push register or PUSHREG and pop register or POPREG, are executed by the CPU. The PUSHREG instruction is used to push the register stack pointer down one level. This is accomplished by incrementing the value contained within the register set select storage area. Conversely, the POPREG instruction is used to move the register stack pointer up one register level. In a alternative embodiment of the present invention, the POPREG and PUSHREG instructions include an argument that specifies the single register stack that is manipulated. In this embodiment, only the specified register stack is pushed using the PUSHREG instruction or popped using the POPREG instruction.

In another embodiment of the present invention, register stack underflow or overflow conditions are trapped using trap handling process. If execution of a PUSHREG instruction is attempted when all auxiliary register levels have been previously allocated (i.e. a full register stack), a processor a trap occurs on this register stack overflow condition. Conversely, if a POPREG instruction is executed when none of the auxiliary registers have been previously allocated (i.e. an empty register stack), a processor trap occurs on the register stack underflow condition.

In a further improvement of the present invention, task switching is implemented using a plurality of register stacks each associated with a frame. Each frame defines the context in which an associated task is operating. A task switch is implemented by simply loading a new frame value (i.e.

register level) into the global frame register (i.e. the register set select storage area). In this manner, a new set of registers is selected. This task switching technique is much faster than the conventional method for task switching which typically requires the loading of all register values from main memory.

In another embodiment of the present invention, the semantics of interrupts to the processor are changed to include an automatic PUSHREG instruction execution. Thus, whenever a processor interrupt is generated, a PUSHREG instruction is automatically executed to save the register contents. Similarly, an automatic POPREG instruction execution occurs upon the return from an interrupt. The automatic execution of PUSHREG and POPREG instructions gives interrupt handlers much more freedom in their actions.

It is, therefore, an object of the present invention to provide a computer system having an expanded register set. It is a further object of the present invention to provide a computer system wherein expanded register set allocation is provided with minimal impact on existing software. It is a further object of the present invention to provide a computer system wherein an expanded register set eliminates the need to explicitly spill register contents to memory. These and other objects of the present invention will become apparent as illustrated and described in the following detailed description of the preferred embodiment.

DETAILED DESCRIPTION OF THE PREFERRED EMBODIMENT

The present invention is an improved computer system architecture employing transparent register stacks for each general purpose register.

In the following description, numerous specific details are set forth in order to provide a thorough understanding of the present invention. However, it will be apparent to one of ordinary skilled in the art that these specific details need not be used to practice the present invention. In other circumstances, well-known structures, circuits, and interfaces have not been shown in detail in order not to obscure unnecessarily the present invention.

Figure 1:
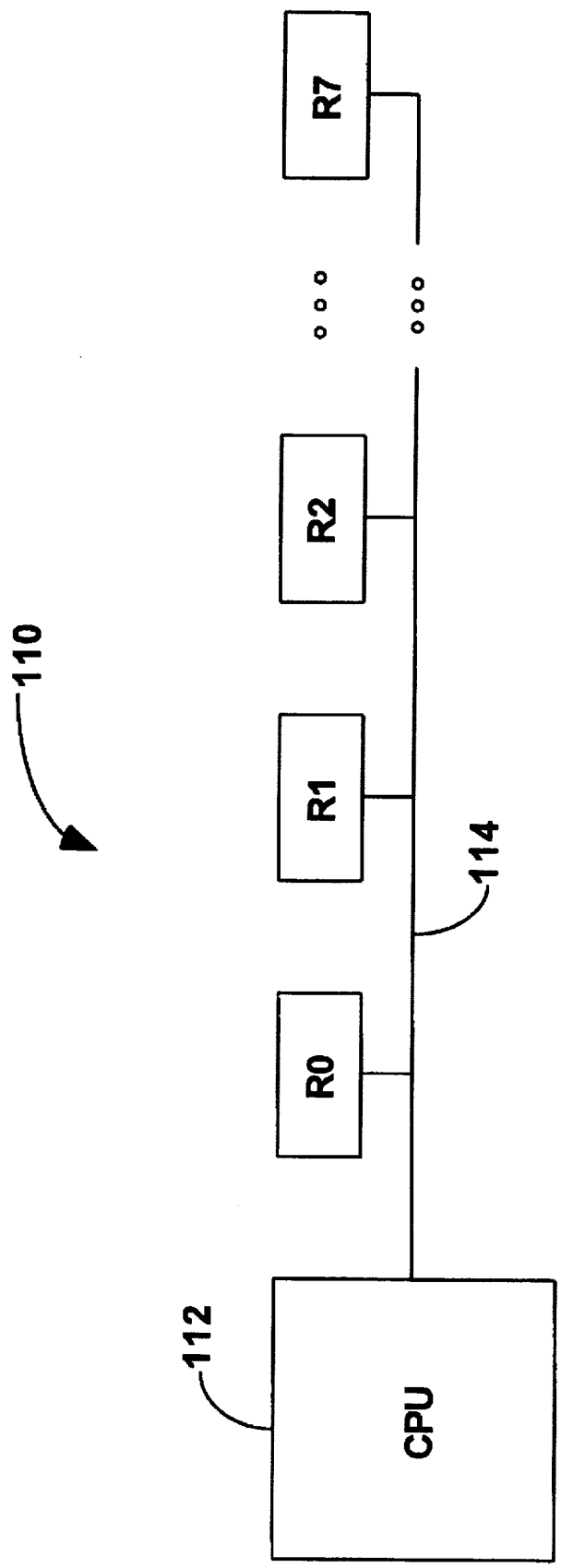
FIG. 1 is an illustration of the prior art computer architecture with a general purpose register set.

Referring to FIG. 1, a block diagram of the prior art computer system architecture is illustrated. CPU 112 of computer system 110 is coupled to a plurality of general purpose registers R0–R7 via data lines 114. Registers R0–R7 are independently identified general purpose registers in which data may be stored or from which data may be read.

Computer system 110 also includes an instruction set executed by CPU 112 with which data may be manipulated using registers R0–R7. By way of example, a typical assembly language instruction of such an instruction set may look like the following: MOV R0, R1. A typical assembly language instruction such as this example may be used to move information from register R0 to register R1. Similarly, other instructions are provided for manipulating data in general purpose registers.

The binary or machine code instruction corresponding to the above sample move instruction contains an operational code (opcode) with which the instruction type (i.e. MOV) is coded. The source and destination register identifiers upon which the instruction operates (i.e. register 0 and register 1 in the example) are also encoded using bits in the machine code instruction. Thus, bits must be allocated in register manipulation instructions for uniquely identifying the register or registers manipulated by the instruction. It will be apparent to those skilled in the art that as the number of general purpose registers increases, the number of bits allocated in a machine instruction for encoding the identity of registers correspondingly increases. The number of register identifier bits encoded in an instruction is increased even more if two or more registers are identified in an instruction such as the move instruction sampled above.

Practical limitations on the size of processor instructions limit the number of general purpose registers that may be uniquely identified within a particular instruction. Thus, a practical limit exists on the number of general purpose registers provided in a particular computer system architecture. Typically, it is easier to add a new instruction type to the instruction than to add a new register to the register set. It will be apparent to those skilled in the art that methods exist in the art for fabricating a register set on a substrate as part of an integrated circuit processor or microprocessor.

Figure 2:
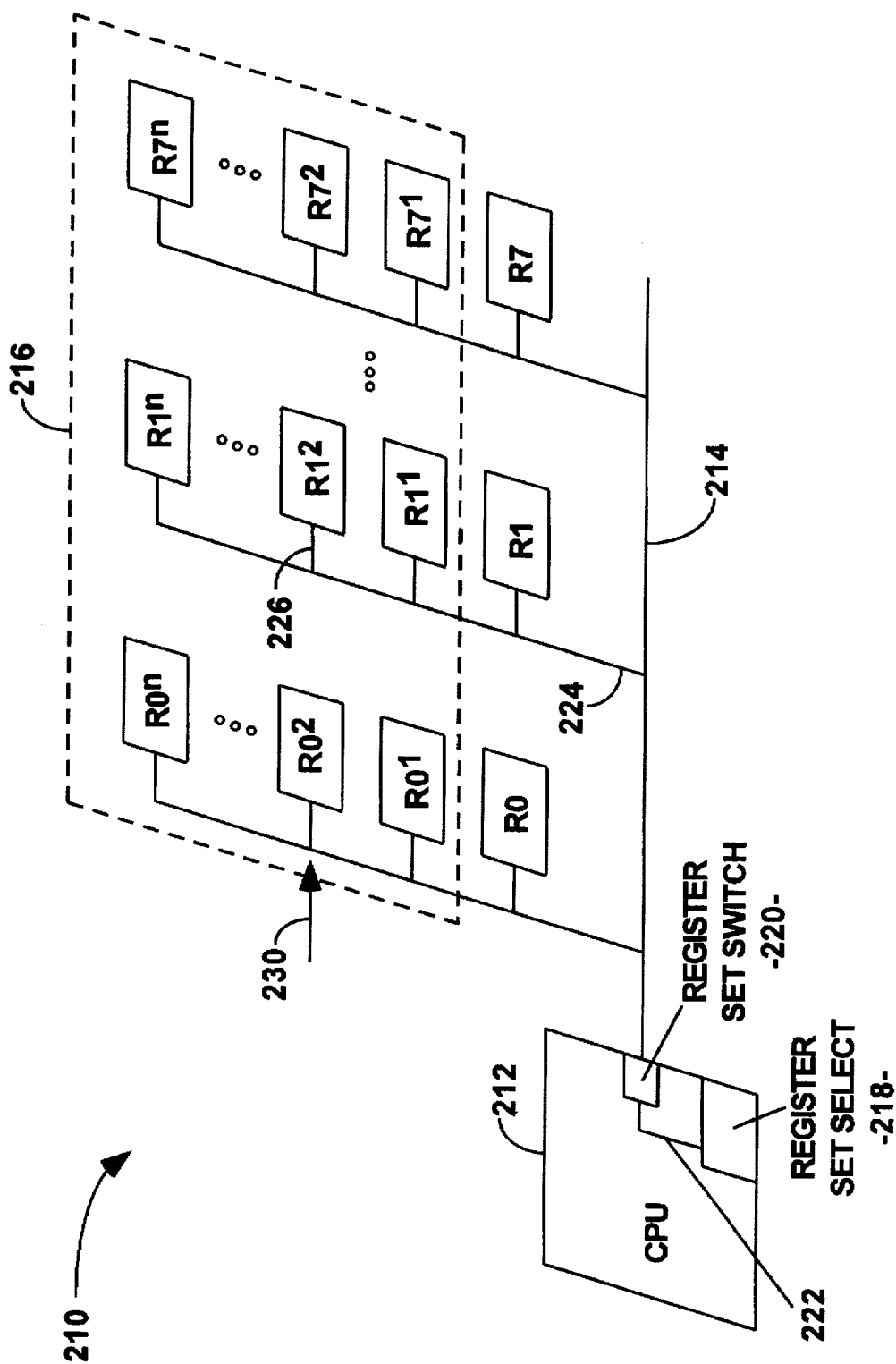
FIG. 2 illustrates the computer system architecture of the present invention with transparent register stacks for each general purpose register.

Referring now to FIG. 2, the improved computer system architecture 210 of the present invention is illustrated. Computer system 210 comprises CPU 212 and a plurality of general purpose registers R0–R7 coupled via data lines 214. In addition, each general purpose register R0–R7 has associated with it and .coupled to it a stack of auxiliary registers 216. Auxiliary registers 216 comprise a set of auxiliary registers for each of the general purpose registers R0–R7 of the computer system 210. For example, register 0 (R0) is associated with and connected to auxiliary registers $R0^1$, $R0^2$, ... $R0^n$. Although these auxiliary registers ($R0^1$–$R0^n$) are named for the purposes of illustration in FIG. 2, no formal register identification scheme is necessary for identifying the auxiliary registers. No register identification bits are necessary in processor instructions for identifying auxiliary registers.

Each general purpose register and its corresponding set of auxiliary registers form a register stack. For example, a register stack is comprised of R0, and $R0^1$–$R0^n$. Similarly, other register stacks for each general purpose register are provided as illustrated in FIG. 2. From the perspective of CPU 212 and processor instructions executing therein, each register stack is identified only by the identity of the corresponding general purpose register (i.e. R0–R7). Thus, no additional register identification bits are required in processor instructions.

A set of registers at the same level in each of the register stacks is termed a register level. For example, a register level is comprised of $R0^1$–$R7^1$. Another register level is comprised of registers R0–R7. In general, register levels comprise registers from $R0^m$–$R7^m$ where m=0, n.

In support of the additional auxiliary registers 216, a register set select storage area 218 is provided in CPU 212. Register set select storage area 218 is a programmable register itself or other fast access storage device. The fabrication of a programmable register in an integrated circuit is well known in the art. The register set select area 218 is used for the storage of a value that identifies the currently active register level. Register set select storage area 218 is loaded using two additional processor instructions provided as part of the present invention. These new processor instructions are described below.

Register set select storage area 218 is connected to register set switch 220 via line 222. Register set switch 220 is used for selecting a data path to the register level specified by register set select storage area 218. Register set switch 220 may be implemented using any one of a variety of commonly available multiplexers.

The register set select storage area 218 may be loaded with any value from 0 to n. This value is denoted a register stack pointer. By way of example, if register set select storage area 218 is loaded with a value of 2, the third register level is selected as indicated by arrow 230 illustrated in FIG. 2. Register set switch 220 enables access to any of the registers in the register level indicated by arrow 230. Specifically, this register level includes registers $R0^2$, $R1^2$, .. .. $R7^2$.

Subsequent to the programming of register set select storage area 218 and the corresponding action by register set switch 220, any register instructions executed by CPU 212 will operate upon the registers in the register level indicated by arrow 230. For example, if a processor instruction specifies the manipulation of register 1 (R1), register set switch 220 enables access to register 1 via data lines 214, 224, and 226. In this manner, register 1 in the register level specified by register set select storage area 218 (i.e. $R1^2$) may be accessed. In a similar manner, any of the other registers in the register level indicated by arrow 230 may be accessed by identifying the desired register only by a register stack designation (i.e. R0–R7). Thus, the use of register stacks is transparent to (i.e. does not require modification of) the register instructions being executed by CPU 212.

As part of the present invention, two register stack manipulation instructions are provided as extensions to the existing instruction set. These instructions, denoted herein as push register or PUSHREG and pop register or POPREG, are executed by CPU 212. The PUSHREG instruction is used to push the register stack pointer down one level. This may be accomplished by incrementing the value contained within register set select storage area 218. The PUSHREG instruction increments the value in register set select storage area 218 thereby causing a new level of registers to be accessible to instructions executing in CPU 212 thereafter. The register contents at the previous register level are retained intact. Conversely, the POPREG instruction is used to move the register stack pointer up one register level. The POPREG instruction causes the value in register set select storage area 218 to be decremented thereby moving the register stack pointer up one level. Means for implementing processor instructions that increment or decrement a register are well known in the art.

In a alternative embodiment of the present invention, the POPREG and PUSHREG instructions include an argument that specifies the single register stack that is manipulated. In this embodiment, only the specified register stack is pushed using the PUSHREG instruction or popped using the POPREG instruction. In support of this embodiment, a variation on the hardware is required as illustrated in FIG. 3.

Figure 3:
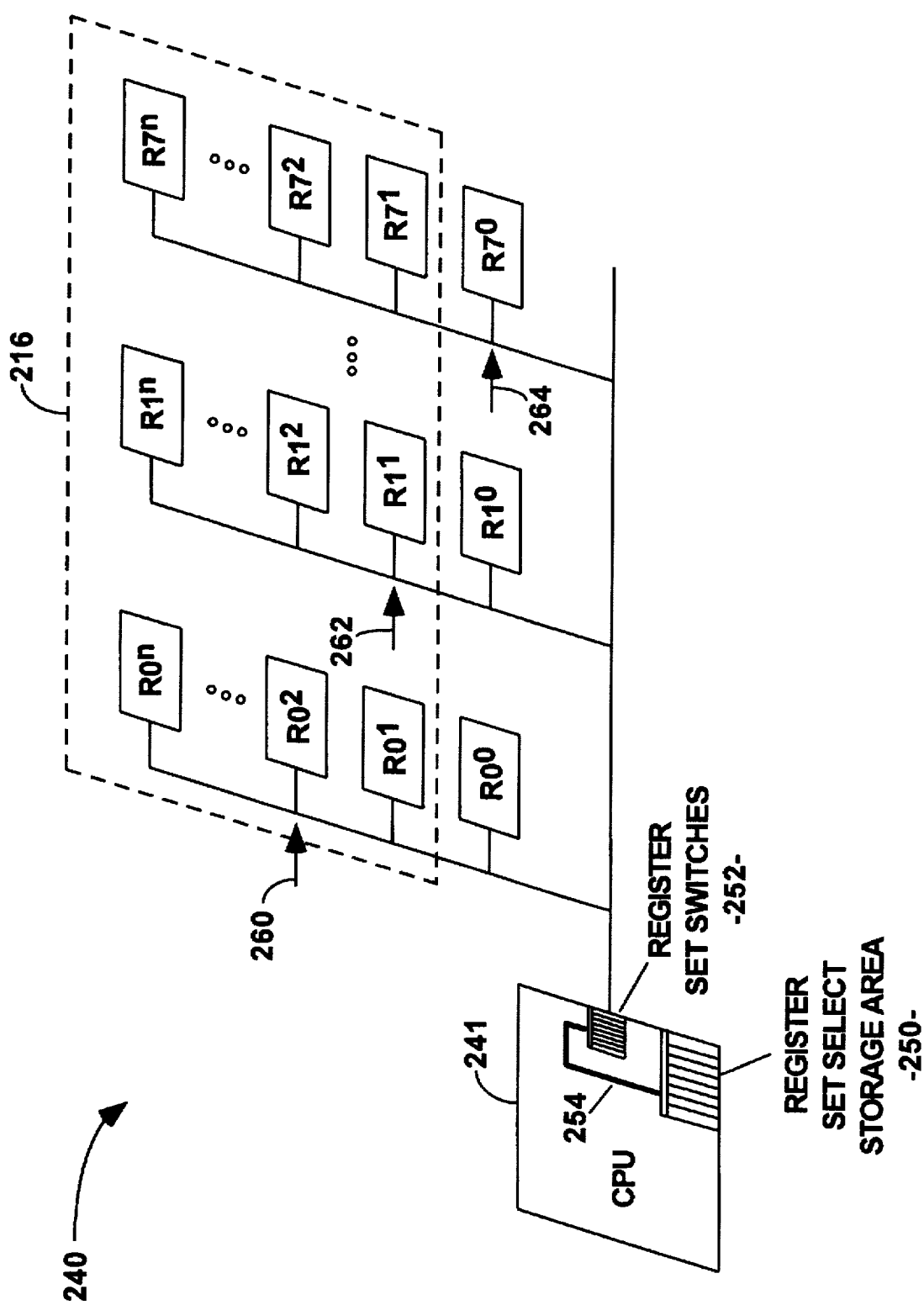
FIG. 3 illustrates an alternative embodiment for manipulating a single specified register set.

Referring now to FIG. 3, an embodiment of the present invention for manipulating a single register stack is illustrated. As shown, computer system 240 includes CPU 241 with register set select storage area 250 and register set switches 252. Register set select storage area 250 now includes a plurality of programmable registers each corresponding to one register stack. Each programmable register is used for storage value that identifies the currently active register level in the corresponding register stack. Thus, each register stack may be independently set to a desired level.

The plurality of programmable registers of register set select storage area 250 is connected to a plurality of switches of register set switches 252. Each programmable register is coupled to a different one of switches 252. Thus, each switch of switches 252 selects a data path to a register level in one of the register stacks as specified by the corresponding programmable register of register set select storage area 250. The fabrication of a programmable register and a switch for programmably selecting one of a plurality of data paths is well known in the art. The programmable registers of register set select storage area 250 are programmed in the same manner as described above for the programming register set select storage area 218.

Having programmed each of the registers of register set select storage area 250 with an independent register stack pointer, the corresponding register level is selected as indicated by arrows 260, 262, and 264 in FIG. 3. Register set switches 252 enable access to the registers in the register level indicated by arrows 260, 262, and 264.

The PUSHREG and POPREG instructions, in this embodiment, include an argument that specifies the identity of the register stack pointer to modify. Such an argument is provided as follows:

PUSHREG n or POPREG n where n is an identifier of one of the available general purpose registers (R0–R7). For example, PUSHREG R1 will increment the register stack pointer corresponding to the register 1 stack without modifying the register stack pointer for any other stack. Similarly, POPREG R1 will decrement the register stack pointer for the corresponding register stack (R1).

In a variation of this embodiment, the argument of the PUSHREG or POPREG instructions is specified as follows:

PUSHREG m or POPREG m where m is a mask value containing a bit corresponding to each register stack. This mask is represented as follows:

| Mask: | Bit 7 | Bit 6 | ... | Bit 0 |
|---|---|---|---|---|
| Corresponding Register Stack: | R7 | R6 | ... | R0 |

In this manner, a mask bit is assigned to each register stack. If a mask bit is set to zero, the push register stack (PUSHREG) or pop register stack (POPREG) operation is not performed on the register stack corresponding to the mask bit. If the mask bit is set to one, the operation is performed on the corresponding register stack. In this manner, a selectable group of register stacks may be manipulated using the PUSHREG or POPREG instructions.

In another alternative embodiment, the POPREG and PUSHREG instructions include an argument that specifies the register level to which the register stack pointer should be moved. In this way, the register stack pointer may be moved to any arbitrary level provided by the particular hardware register stack structure. It will be apparent to those skilled in the art that the incrementing and decrementing of the register stack pointer is performed modulo the number of register levels provided in a register stack. It will also be apparent to those skilled in the art that the number of auxiliary registers accessible using the means and methods described herein may be arbitrarily large.

Figure 4:
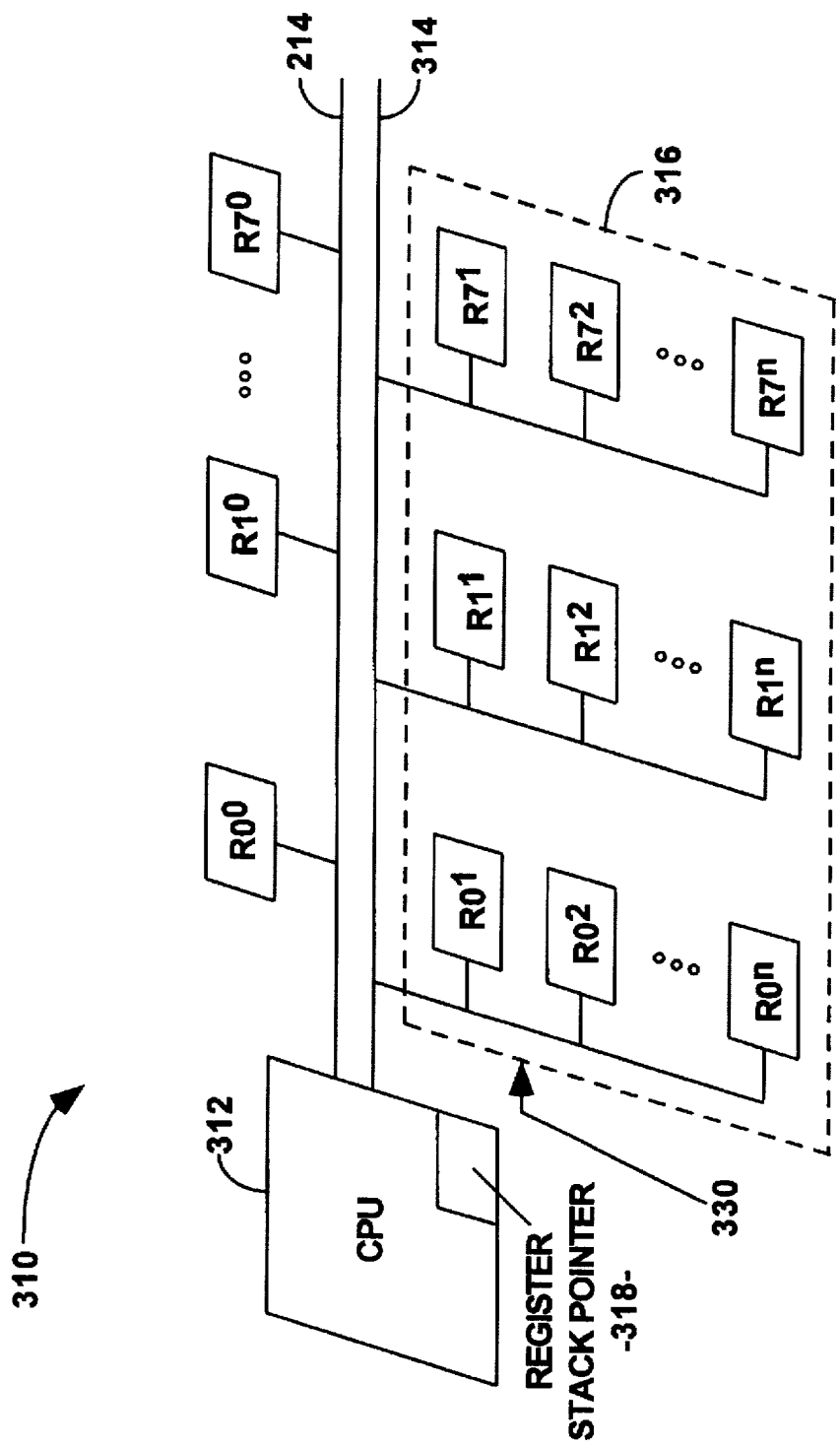
FIG. 4 illustrates an alternative embodiment of the present invention using a dual register bus architecture.

Referring now to FIG. 4, an alternative embodiment of the present invention is illustrated. In this alternative embodiment, general purpose registers R0–R7 are coupled to CPU 312 via lines 214. In addition, auxiliary registers 316 are coupled to CPU 312 via lines 314. Auxiliary registers 316 comprise a set of registers similar to auxiliary registers 216 described above in relation to FIG. 2. In contrast to the structure illustrated in FIG. 2, general purpose registers R0–R7 are the only general purpose registers directly accessible to instructions executing in CPU 312. The instructions executed by CPU 312, therefore, always reference registers R0–R7 on data lines 214.

The alternative embodiment depicted in FIG. 4 includes a register stack pointer 318 within CPU 312. Register stack pointer 318 as implemented in a programmable register or other fast access storage means identifies the level of registers currently active. Arrow 330 depicts an example of a value of 2 stored in register stack pointer 318.

When a register level is currently active, a copy of the contents of each of the registers in that level are maintained in the corresponding general purpose registers R0–R7. These register contents may then be manipulated by register instructions executed by CPU 312.

In the alternative embodiment illustrated in FIG. 4, two instructions for manipulating the register stack pointer are provided as extensions to the existing instruction set. These instructions, denoted herein as push register (PUSHREG) and pop register (POPREG), are executed by CPU 312. Upon execution of a PUSHREG instruction, the contents of general purpose registers R0–R7 are transferred to the corresponding auxiliary registers referenced by register stack pointer 318. The register stack pointer is then incremented to the next higher register level and the contents of the registers at this new level are transferred to corresponding registers R0–R7. Upon execution of the next register instruction by CPU 312, the contents of general purpose registers R0–R7 will correspond to the contents of the registers at the new register level. Means for transferring information between registers in a processor is well known in the art. Similarly, means for incrementing or decrementing register contents is well known in the art.

In a similar fashion for execution of the POPREG instruction, the contents of general purpose registers R0–R7 are first transferred to the corresponding registers at the register level referenced by register stack pointer 318. The register stack pointer 318 is then decremented to the next lower register level, and the contents of the auxiliary registers at this new register level are transferred to corresponding registers R0–R7. Register instructions executed by CPU 312 may then manipulate the contents of the new register level now loaded in general purpose registers R0–R7. In this manner, an arbitrarily large set of auxiliary registers may be used to support an existing set of general purpose registers without the need for modifying the instruction format to provide access to the set of auxiliary registers.

The present invention described herein improves the prior art computer architecture by allowing the extension of a register architecture without requiring modification of existing software. The present invention also eliminates the need to spill register contents to memory. In addition, the generation of machine code by compilers is eased considerably as register spill conditions are ignored and values are preserved across basic processing blocks more easily. Although the registers illustrated in FIGS. 2–4 are shown external to the CPU, these registers may equivalently be incorporated into the CPU. It will also be apparent that registers R0–R7 may be any number of bits wide; although, typically each of the registers of the general purpose register set are the same number of bits wide.

In another embodiment of the present invention, register stack underflow or overflow conditions are trapped using stack handling process. If execution of a PUSHREG instruction is attempted when all auxiliary register levels have been previously allocated (i.e. a full register stack), a processor trap occurs on this register stack overflow condition.

Figure 5:
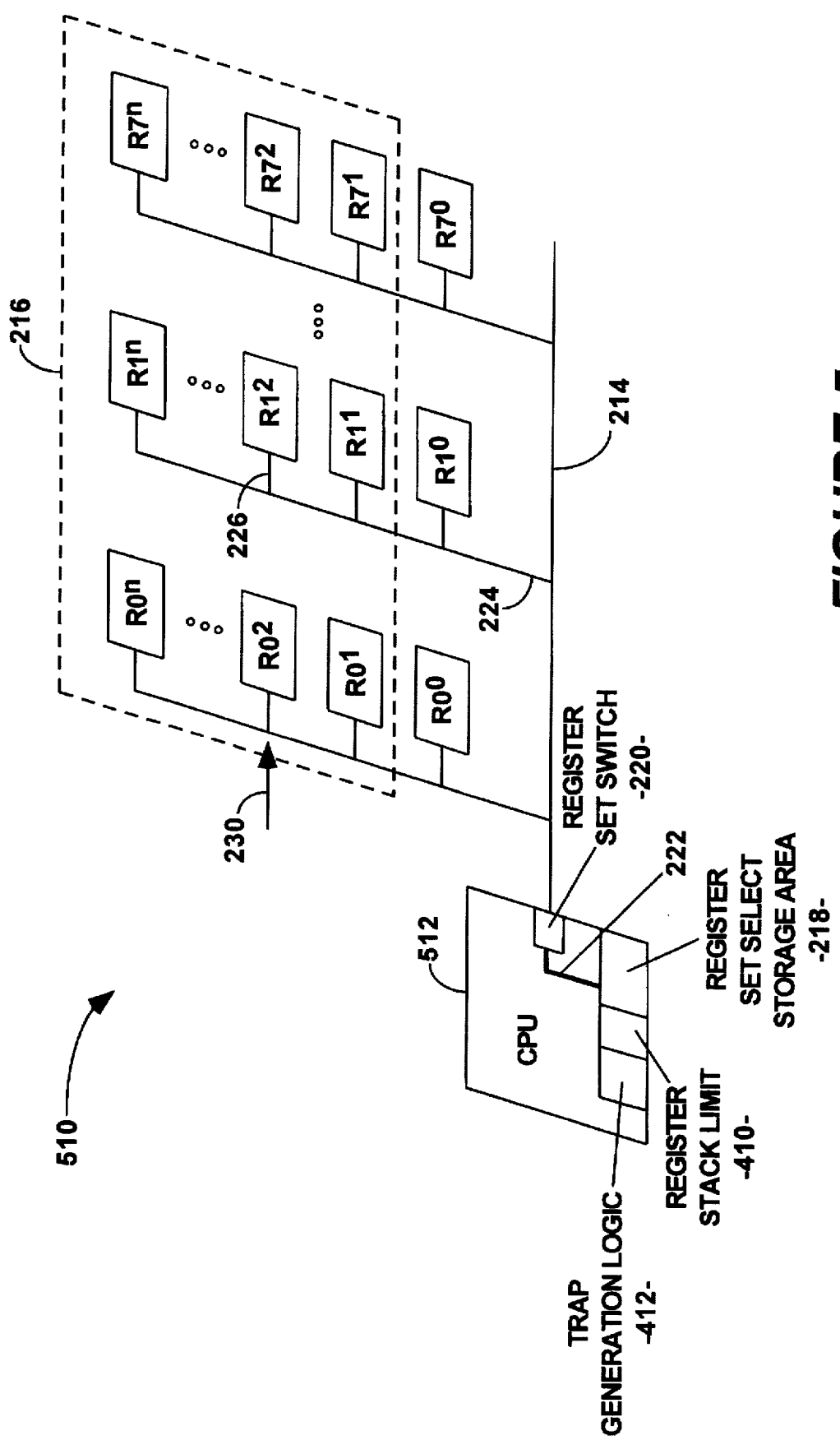
FIG. 5 illustrates an alternative embodiment for handling register stack overflow and underflow conditions.

Referring now to FIG. 5, the embodiment of the present invention presented in FIG. 2 is improved to include register stack underflow and overflow condition trapping. Computer system 510 now includes a register stack limit register 410 and trap generation logic 412. Register stack limit register 410 contains a upper and a lower limit value that represents a boundary beyond which the value stored in register set select storage area 218 is not allowed to cross. Upon execution of a PUSHREG instruction, trap generation logic 412 compares the upper limit value stored in the register stack limit register 410 with the value stored in register set select storage area 218. If the values are equal, the register stack is full and an overflow trap is generated by trap generator logic 412 to CPU 512. Register stack limit register 410 may be a programmable register or a fixed content register. Fabrication of both types of these registers in an integrated circuit is well known in the art. Trap generation logic 412 is implemented using conventional methods for building logic for comparing two register values and for generating a trap to a CPU.

Conversely, if a POPREG instruction is executed when none of the auxiliary registers have been previously allocated (i.e. an empty register stack), a processor trap occurs on the register stack underflow condition.

Again referring to FIG. 5, upon execution of a POPREG instruction, trap generation logic 412 compares the lower limit value stored in the register stack limit register 410 with the value stored in register set select storage area 218. If the values are equal, the register stack is empty and an underflow trap is generated by trap generator logic 412 to CPU 512.

Upon the occurrence of a register stack overflow trap as described above, trap handler for this interrupt moves data items from the bottom of the register stack (i.e. the register level to which the register stack pointer is pointing) to main memory. On an underflow trap, the trap handler moves data items from main memory to the top of the register stack (i.e. the register level to which the register stack pointer is pointing). Using trap handlers for processing underflow and overflow operations, the present invention can be extended beyond an architectural limit on the number of registers imposed in a specific implementation.

In a further improvement of the present invention, task switching is implemented using a plurality of register stacks each associated with a frame. Each frame defines the context in which an associated task is operating. The use of frames in a task switching system is well known in the art. A particular frame is selected using a value defined in a global frame register. The global frame register is the same register as register set select storage area 218 described above and illustrated in FIGS. 2 and 4. Each frame has associated with it a register level as described above. A task switch is implemented by simply loading a new frame value (i.e. register level) into the global frame register (i.e. the register set select storage area 218). In this manner, a new set of registers is selected. This task switching technique is much faster than the conventional method for task switching which typically requires the loading of all register values from main memory.

In another embodiment of the present invention, the semantics of interrupts to the processor are changed to include an automatic PUSHREG operation execution. Thus, whenever an external processor interrupt is generated, a PUSHREG operation is automatically executed to save the register contents. Similarly, an automatic POPREG operation execution occurs upon the return from an interrupt. The automatic execution of PUSHREG and POPREG operations gives interrupt handlers much more freedom in their actions. Instead of the interrupt handlers having to explicitly preserve all of the registers to some memory resident area before processing, the interrupt handler may simply assume that the registers have already been saved. Similarly, the interrupt handlers do not need to restore register values from memory before returning to the interrupted context. Thus, the size and complexity of interrupt handlers may be reduced.

Thus, a computer system is disclosed which provides an expanded register set by employing transparent register stacks for each general purpose register.

Although the invention is described herein with reference to a specific embodiment, many modifications and variations therein will readily occur to those skilled in the art. Accordingly, all such variations and modifications are included within the intended scope of the present invention as defined by the following claims.

What is claimed is:

1. A computer comprising:
   a central processing unit (CPU) for executing instructions, each instruction having register identifying bits;
   a plurality of register stacks, each register stack including:
   a general purpose register switchably coupled to said CPU;
   at least one auxiliary register switchably coupled to said CPU, each general purpose register and each auxiliary register occupying a corresponding register stack level of said register stack, both said general purpose register and said at least one auxiliary register within the same stack being identified by the same value residing in said register identifying bits;
   selection circuitry including at least one programmable storage element, each storage element for storing a register stack level pointer, said pointer for selecting either a general purpose register or an auxiliary register at a corresponding level within at least one stack, wherein said register stack level pointer is controlled solely through execution of at least one register stack operation; and
   switching circuitry for switching, for each register stack, between a first data path from said CPU to said general purpose register or a second data path from said CPU to one of said at least one auxiliary registers depending upon the register selection by said selection circuitry.

2. The computer of claim 1, further comprising trap generating circuitry for generating a trap if a register stack operation is executed to select one of said auxiliary registers within a stack when said register stack level pointer indicates that all of said auxiliary registers within said stack have already been allocated.

3. The computer of claim 1, further comprising trap generating circuitry for generating a trap if a register stack operation is executed to select said general purpose register when said register stack level pointer indicates that said general purpose register has already been allocated.

4. The computer of claim 1, the computer further comprising task switching circuitry for switching among tasks, wherein the selection of either said general purpose register or one of said at least one auxiliary registers within a stack depends upon which task is active.

5. The computer of claim 1, wherein at least one register within at least one corresponding register stack is selected by said selection circuitry upon execution of a push register stack operation, wherein said push register stack operation is executed automatically upon the occurrence of an interrupt to the CPU.

6. The computer of claim 5, wherein at least one register within at least one corresponding register stack is selected by said selection circuitry upon execution of a pop register stack operation, wherein said pop register stack operation is executed automatically upon a return from the interrupt to the CPU.

7. The computer of claim 1, wherein the at least one register stack operation specifies the register stack level pointer.

8. The computer of claim 1, wherein the at least one register stack operation is a push operation and a pop operation for respectively incrementing and decrementing the register stack level pointer.

9. The computer of claim 1, wherein the register selection within one stack is independent of the register selection within at least one other stack.

10. A computer comprising:
    a central processing unit (CPU) for executing instructions, each instruction having register identifying bits;
    a plurality of register stacks, each register stack including:
    a general purpose register switchably coupled to said CPU;
    at least one auxiliary register switchably coupled to said CPU, each general purpose register and each auxiliary register occupying a corresponding register stack level of said register stack, both said general purpose register and said at least one auxiliary register within the same stack being identified by the same value residing in said register identifying bits;
    selection circuitry including at least one programmable storage element, each storage element for storing a register stack level pointer, said pointer for selecting an auxiliary register at a corresponding level within at least one stack, wherein said register stack level pointer is controlled solely through execution of at least one register stack operation; and
    swapping circuitry for swapping the contents of a general purpose register and an auxiliary register within a register stack when the auxiliary register is selected by said selection circuitry, and for swapping back the contents of the general purpose register and a previously selected auxiliary register in response to the auxiliary register being selected by said selection circuitry, wherein the auxiliary register, the previously selected auxiliary register, and the general purpose register are within the same register stack.

11. In a computer having a central processing unit (CPU), said CPU for executing an instruction in an instruction stream, said instruction having register identifying bits, the CPU further including a plurality of register stacks, each register stack having a general purpose register switchably coupled to said CPU and at least one auxiliary register switchably coupled to said CPU, each general purpose register and each auxiliary register occupying a corresponding register stack level of said register stack, both said general purpose register and said at least one auxiliary register within the same stack being identified by the same value residing in said register identifying bits, a process for accessing a register, said process comprising the steps of:

executing at least one register stack operation to manipulate at least one register stack level pointer;

selecting either said general purpose register or one of said at least one auxiliary registers at a corresponding level within at least one register stack solely according to said pointer manipulated by said at least one register stack operation;

for each register stack, switching between a first data path from said CPU to said general purpose register or a second data path from said CPU to one of said at least one auxiliary registers depending upon the register selection made in said selecting step; and accessing a register identified by said register identifying bits.

12. The process of claim 11, further comprising the step of generating a trap if a register stack operation is executed to select one of said auxiliary registers within a stack when all of said auxiliary registers within said stack have already been allocated.

13. The process of claim 11, further comprising the step of generating a trap if a register stack operation is executed to select said general purpose register within a stack when said general purpose register within said stack has already been allocated.

14. The process of claim 11, the computer further comprising task switching circuitry for switching among tasks, wherein in said selecting step the selection of either said general purpose register or one of said at least one auxiliary registers within a stack depends upon which task is active.

15. The process of claim 11, wherein the selecting step further comprises the step of automatically executing a push register stack operation upon the occurrence of an interrupt to the CPU, wherein the execution of said push register stack operation selects at least one auxiliary register within at least one corresponding register stack.

16. The process of claim 15, wherein the selecting step further comprises the step of automatically executing a pop register stack operation upon a return from the interrupt to the CPU, wherein the execution of said pop register stack operation selects at least one register within at least one corresponding register stack.

17. The method of claim 11, wherein the at least one register stack operation specifies the register stack level pointer.

18. The method of claim 11, wherein the at least one register stack operation is a push operation and a pop operation for respectively incrementing and decrementing the register stack level pointer.

19. The method of claim 11, wherein the register selection within one stack is independent of the register selection within at least one other stack.

20. In a computer having a central processing unit (CPU), said CPU for executing an instruction in an instruction stream, said instruction having register identifying bits, the CPU further including a plurality of register stacks, each register stack having a general purpose register switchably coupled to said CPU and at least one auxiliary register switchably coupled to said CPU, each general purpose register and each auxiliary register occupying a corresponding register stack level of said register stack, both said general purpose register and said at least one auxiliary register within the same stack being identified by the same value residing in said register identifying bits, a process for accessing a register, said process comprising the steps of:

executing at least one register stack operation to manipulate at least one register stack level pointer;

selecting one of said at least one auxiliary registers at a corresponding level within at least one register stack solely according to said pointer manipulated by said at least one register stack operation;

accessing a register identified by said register identifying bits; and swapping the contents of a general purpose register and an auxiliary register within a register stack when the auxiliary register is selected in said selecting step, and swapping back the contents of the general purpose register and a previously selected auxiliary register in response to the auxiliary register being selected, wherein the auxiliary register, the previously selected auxiliary register, and the general purpose register are within the same register stack.

* * * * *

UNITED STATES PATENT AND TRADEMARK OFFICE
CERTIFICATE OF CORRECTION

| | | |
|---|---|---|
| PATENT NO. | : | 5,640,582 |
| DATED | : | June 17, 1997 |
| INVENTOR(S) | : | Hays et al. |

It is certified that error appears in the above-identified patent and that said Letters Patent is hereby corrected as shown below:

In column 1 at line 15 delete "modem" and insert --modern--

Signed and Sealed this

Twenty-third Day of September, 1997

Attest:

BRUCE LEHMAN

*Attesting Officer*    *Commissioner of Patents and Trademarks*